Figure 1:
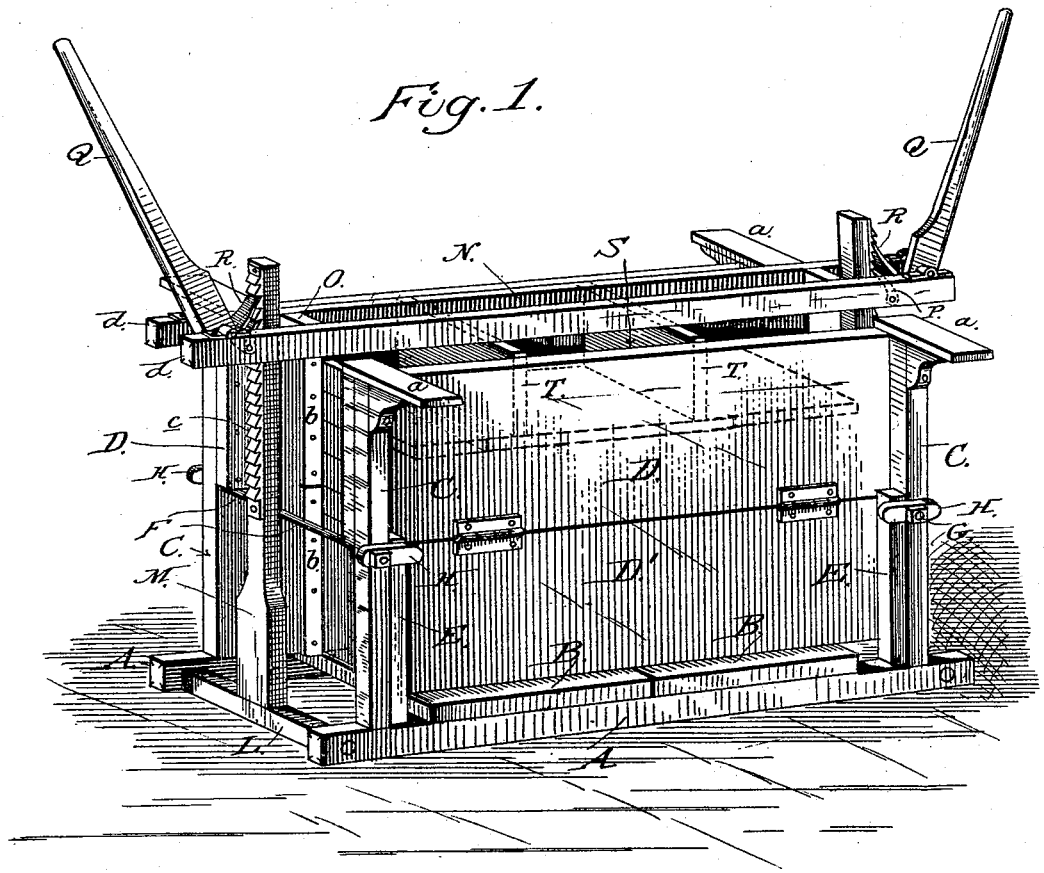

(No Model.) 2 Sheets—Sheet 1.

C. T. ANDERSON
BALING PRESS.

No. 457,177. Patented Aug. 4, 1891.

WITNESSES
Chapman Fowler
J. Edw. Fowler

INVENTOR
Charles T. Anderson,
by A. H. Evans & Co
Attorneys

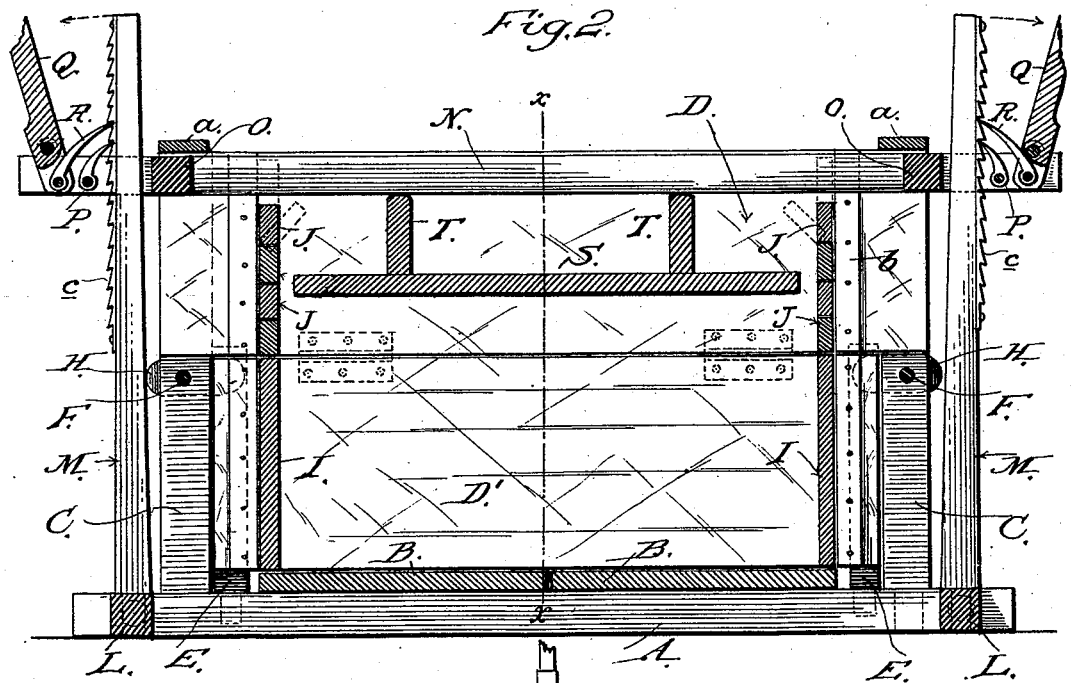

UNITED STATES PATENT OFFICE.

CHARLES T. ANDERSON, OF TAMPICO, WASHINGTON.

BALING-PRESS.

SPECIFICATION forming part of Letters Patent No. 457,177, dated August 4, 1891.

Application filed January 2, 1891. Serial No. 376,440. (No model.)

*To all whom it may concern:*

Be it known that I, CHARLES T. ANDERSON, a citizen of the United States, residing at Tampico, in the county of Yakima and State of Washington, have invented certain new and useful Improvements in Baling-Presses, as set forth in the accompanying drawings, forming part of this specification, in which—

Figure 1 represents a perspective view of my improved baling-press. Fig. 2 is a longitudinal sectional view of the same. Fig. 3 is a cross-sectional view on the line $x\ x$ of Fig. 2. Fig. 4 is a detail.

My invention relates to certain new and useful improvements in baling-presses; and it consists in the constructions and combinations of devices, which I shall hereinafter fully describe and claim.

To enable others skilled in the art to which my invention appertains to make and use the same, I will now describe its constructions and indicate the manner in which the same are carried out.

In the accompanying drawings, A represents suitable horizontal beams extending the full length of the machine and forming the foundation-sills upon which the machine is supported, and B indicates a floor laid upon said sills and forming the bottom of the baling-chamber. Near the ends the foundation-sills are mortised to receive the uprights C, which constitute the corner-posts of the machine, their upper ends having laterally-extending supports or platforms $a$, upon which the follower is supported when not in use, as I shall hereinafter fully describe. The sides of the baling-chamber are formed of two pieces D D', the former being rigidly secured to the corner-posts upon the same side, and the latter section or doors D' being hinged to the fixed sections D and adapted to be swinging upward to expose the lower portion of the baling-chamber and to permit the removal of the compressed bale.

To retain the hinged sections or doors in position while the bale is being compressed, I employ suitable short posts or uprights E, having their lower ends formed to fit sockets in the foundation-sills, the said posts E lying in the angles formed by the hinged sections of the sides and the corner-posts C, whereby they bear against said hinged sections or doors. The lower ends of the posts E, which enter the sockets in the foundation-sills, are preferably cut away on one side, so that these posts may fall out of engagement with said sills when their upper ends are released, thereby enabling the hinged section or doors D' to be opened.

To secure the upper ends of the posts E, I employ suitable rods F, which pass transversely through the corner-posts C, these rods being provided with heads and having their opposite ends threaded and engaged by nuts G, while upon said rods, between the heads and nuts and the corner-posts, are buttons H, which are adapted to turn upon the rods so that their outer ends pass in front of the upper ends of the posts E to hold them in place and to brace and secure the hinged sections or doors D' while the bale is being pressed. These buttons are also designed to engage the hinged sections or doors D' when the latter are raised and to hold said doors elevated while the bale is being removed from the press. The ends of the baling-chamber are formed by the end pieces I, fitted against cleats $b$ on the inside of the doors or sections D' and extending about the height of said doors, while above this point the sides are made up of a series of comparatively narrow pieces J, loosely seated, for a purpose hereinafter described.

Within the outer ends of the foundation-sills are mounted rocking beams L, to the central portions of which suitable uprights or arms M are secured and have their outer faces formed or provided with ratchet-surfaces $c$. When the machine is in operative position, these uprights or arms M pass through the follower N, which consists, essentially, of two longitudinally-extending bars $d$, placed in a horizontal position and separated from each other to permit the entrance of the upper ends of the uprights or arms M and joined together by cross-pieces or blocks O.

Near the outer ends of the follower and between the inner walls of the spaced bars are pivotally-mounted pawls P, adapted to engage the ratchet-surfaces of the uprights or arms M, and upon the follower, near the ends thereof, are fulcrumed operating-levers Q, whose lower ends are provided with pivotallysecured pawls R, also designed to engage said ratchet-surfaces and to operate, in conjunction with the pawls P, in the manner hereinafter stated.

S represents a press-board adapted to lie upon the charge of material, and having cross-bars T upon its upper surface inside of the ends, upon which the follower bears.

In operating my machine the doors or hinged sections D' are closed and secured by the turn-buttons H, and the end pieces are placed in position so as to close the ends, and thereby form with the sides and bottom the baling-chamber, whose top is open to receive the hops, hay, straw, cotton, or other material to be baled. The charge of material is now placed in this chamber and the press-board S placed on top of it, with its flat side down, after which the follower is lifted from its supports or platform $a$ and laid upon the cross-bar T of the press-board. The uprights or arms M are now raised and their upper ends passed through the follower, so that the pawls P will engage the ratchet-faces thereof. The levers Q are now moved back and forth, and their pawls R by engaging the ratchet-faces of the uprights M cause the follower to descend and force the press-block S with great pressure against the material. As the levers Q are lifted at the end of their downward stroke, their pawls slip by the ratchet-faces, and the pawls P operate as retaining the pawls to hold the follower down until the lever-pawls have obtained a new engagement with said surfaces and are again operated. As the follower moves downward, the narrow pieces which form the upper part of the ends of the baling-chamber fall inward upon the press-board as each one is passed by the compressed material, thereby enabling the follower to move to the limit of its downward stroke. When the bale has been sufficiently pressed, the pawls are thrown back and the follower lifted out of the press and placed upon the supports or platforms $a$, and the uprights are swung downward out of the way. The turn-buttons are now moved to release the uprights E, which fall outward, and the hinged sections or doors are turned up to expose the baling-chamber, and are secured in this latter position by again turning the buttons so that they may engage them. When the doors are raised, the end boards I fall outward, thereby giving unobstructed access to the bale and permitting the binding and securing of the same in any well-known manner.

Having thus described my invention, what I claim as new, and desire to secure by Letters Patent, is—

1. In a baling-press having doors at the lower portion of its sides, the means for securing said doors, consisting of the uprights E at both ends of the doors, having their lower ends fitted in sockets in the foundation-sills of the press, and the rods F, provided with buttons H, adapted to bear against said upright to hold the doors closed and to engage and support the doors when the latter are raised, substantially as herein described.

2. In a baling-press open at its top and having lower doors, with means for securing the same, a follower and means for operating it, the independent pieces forming the ends of the press, and an independent press-board having cross-bars inside of its ends upon which the follower bears, said independent end pieces being adapted to fall inward upon the ends of the press-board as the latter is forced downward by the follower, substantially as herein described.

CHARLES T. ANDERSON.

Witnesses:
GEORGE S. COURTER,
FRED PARKER.